May 5, 1925.

R. A. LIGHT ET AL 1,536,595

METALLIC PACKING RING

Filed Dec. 22, 1922

Inventors.
Ralph A. Light,
and Joseph W. Price Jr.
by Francis D. Chamber
their Attorney.

Patented May 5, 1925.

1,536,595

UNITED STATES PATENT OFFICE.

RALPH A. LIGHT AND JOSEPH W. PRICE, JR., OF PHILADELPHIA, PENNSYLVANIA, ASSIGNORS TO THE UNITED STATES METALLIC PACKING COMPANY, OF PHILADELPHIA, PENNSYLVANIA, A CORPORATION OF PENNSYLVANIA.

METALLIC PACKING RING.

Application filed December 22, 1922. Serial No. 608,463.

*To all whom it may concern:*

Be it known that we, RALPH A. LIGHT and JOSEPH W. PRICE, Jr., citizens of the United States of America, and residents of Philadelphia, in the county of Philadelphia, in the State of Pennsylvania, have invented certain new and useful Improvements in Metallic Packing Rings, of which the following is a true and exact description, reference being had to the accompanying drawings, which form a part thereof.

Our invention relates to metallic packing rings of the type in which the ring is made up of four parts, two of which constitute packing blocks and two of which constitute guide blocks on which the packing blocks are free to move toward and away from each other and which properly space the packing blocks from each other. In packing rings of this kind it is usual that the packing blocks should be pressed inward by spring pressure and it is usual also that such a packing block should be used in pairs abutted against each other laterally and that means should be employed for maintaining the abutted packing blocks in proper relation to each other.

The object of our invention is to provide in the first place for the use of a garter spring to hold the blocks of each ring together and to provide for use in connection with such a garter spring a receiving groove of such shape that the main force of the spring will be exerted on the packing block sections of the ring. Another object of our invention is to provide in connection with such a packing ring a lug extending radially outward from one of the sections, preferably a guide block section, which in cross section has its sides angled toward each other so as to fit in a recess with angling sides formed in the retaining ring which in the usual packing encloses both of the packing rings. This last mentioned constructive feature is especially useful where the retaining ring is, as we prefer to make it a segmentary ring, a portion of the ring sufficient to give passage to the piston rod being cut away so that the ring can be placed over the rod by a lateral motion. With this segmentary ring it is obviously important that the abutted rings should be held in such position that they will break joint with each other and also in such fixed position with regard to the segmental ring that each packing ring segment will be held in position by the retaining ring and our construction makes this practicable.

The nature of our improvements will be best understood as described in connection with the drawings in which they are illustrated and in which—

Figure 4:
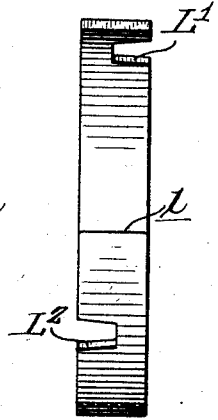

Figure 4, a side elevation of the retaining ring, and

Figure 1:
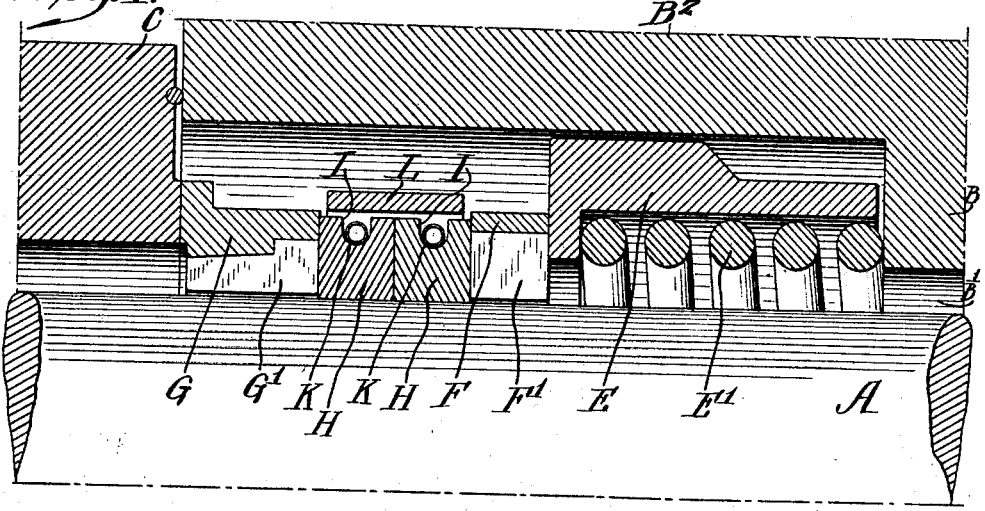
Figure 1 is a view illustrating the general make-up of the packing in connection with which our rings are employed, the view being sectional and showing only one side of the packing.
Figure 3:
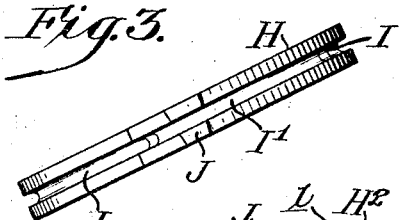
Figure 3 is an end view of one of the rings.
Figure 2:
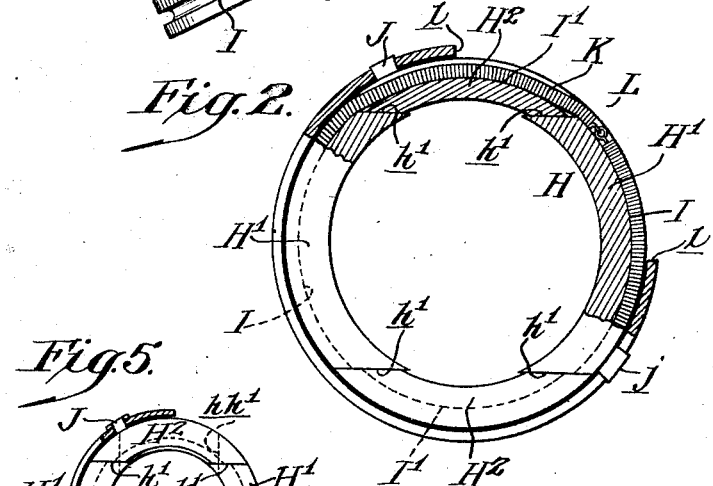
Figure 2 is a side elevation of our improved packing ring enclosed in a segmental retainer ring and shown partly in section.
Figure 5:
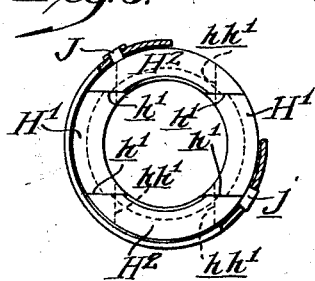

Figure 5 is a view generally similar to Fig. 2, but showing the position of the rear packing ring segments in dotted lines.

A indicates a piston rod extending outward from the cylinder, the head of which is indicated at B; B' indicating the opening through which the piston rod extends and B² a gland formed on the outside of the head for the reception of the packing; C indicating a gland closure of the usual type. E is a plunger pressed outward by means of the spring indicated at E'. F indicates a ring enclosing the sectional ring F'. G is also a ring enclosing sectional portions G'. H and H indicate the packing rings and L the retaining ring. In all of the above parts except as hereinafter pointed out the packing is a very commonly used type.

Our ring H is made up of two packing sections indicated at H', H', spaced apart by guide sections or blocks indicated at H², H², the contacting surfaces of the packing sectors and guide sectors being indicated at $h'$, $h'$, etc., and lying in two parallel planes. Round the outside of each packing ring section we form a groove for the reception of a garter spring, the groove in the packing sectors being indicated at I and in the guide sectors at I', and it will be noticed that the grooves in the guide lie closer to the center of the ring than do the grooves in the packcated at K will exert its elastic force more energetically on the packing sectors than on the guide sectors.

On one of the sectors of the ring we form a radially extending lug indicated at J which in cross section has its sides angling toward each other, as shown, so that the outline of the section is practically a truncated triangle and in the retaining ring L we form on opposite sides similary formed recesses indicated at L' and L² in which these lugs will fit. The prime function of these lugs is to hold by their engagement with the retaining ring L the two abutted packing rings in proper relation to each other to form a tight joint, and the angular form given to the lugs and the recesses in the retaining ring is for the purpose of insuring that the rings can only be inserted in the retaining ring in one direction so that the properly prepared sides of the rings which are to come in contact with each other must necessarily always be in contact when the rings are assembled in the retaining ring. In Fig. 5 the joints between the segments of the rear packing ring are indicated in dotted lines and marked $hh'$.

By preference we form the ring L with a cut away portion as shown at $l\,l$ so that it can be placed laterally over the rod and it will be obvious that in using this segmental retaining ring it is necessary that the segmental packing ring should be held in such position that each segment will lie within at least a sufficient section of the retaining ring to insure its being held in position should the garter spring break and our described construction insures that this shall be the case.

We may mention that the packing ring illustrated and above described is preferably formed from a cast blank and by the method which we have described in our copending application, filed December 22, 1922, Serial No. 608,462.

Having now described our invention, what we claim as new and desire to secure by Letters Patent, is:

1. A metallic packing ring made up of four sectional blocks abutting against each other in two parallel planes so that the end or packing blocks can slide freely towards each other on the abutting ends of the side or guide blocks, said sectional blocks being externally circumferentially grooved for the reception of a garter spring and the grooves in the side or guide blocks being formed deeper than in the end or packing blocks, so that the pull of the spring will be mainly exerted on the packing blocks.

2. A metallic packing ring made up of four sectional blocks abutting against each other in two parallel planes so that the end or packing blocks can slide freely towards each other on the abutting ends of the side or guide blocks, one of said blocks being formed with a radially extending lug of tapered shape in cross section.

3. A metallic packing ring made up of four sectional blocks abutting against each other in two parallel planes so that the end or packing blocks can slide freely towards each other on the abutting ends of the side or guide blocks, one of said blocks being formed with a radially extending lug of tapered shape in cross section, said sectional blocks being externally circumferentially grooved for the reception of a garter spring and the grooves in the side or guide blocks being formed deeper than in the end or packing blocks so that the pull of the spring will be mainly exerted on the packing blocks.

4. A metallic packing comprising two segmental packing rings each made up of two guide blocks and two packing blocks and one block of each ring having a radially extending lug in combination with a segmental retaining ring extending over more than 180° but having an opening between its ends sufficient to give passage to a piston rod, said segmental retaining ring extending over both rings and having lateral notches formed in opposite edges to engage the lugs of the packing rings.

5. A metallic packing comprising two segmental packing rings each made up of two guide blocks and two packing blocks and one block of each ring having a radially extending lug of tapered cross section, in combination with a segmental retaining ring having an opening between its ends sufficient to give passage to a piston rod, said segmental retaining ring having lateral notches of tapered cross section and of approximately the size and shape of the tapered lugs on the blocks, formed in opposite edges to engage the lugs of the packing rings.

RALPH A. LIGHT.
JOS. W. PRICE, Jr.